(12) United States Patent
Drane et al.

(10) Patent No.: US 9,614,359 B2
(45) Date of Patent: Apr. 4, 2017

(54) LOW PROFILE WHILE-IN-USE ELECTRICAL BOX AND COVER

(71) Applicant: Thomas & Betts International LLC, Wilmington, DE (US)

(72) Inventors: Mark R. Drane, Collierville, TN (US); Henry Stefanov, Memphis, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 15/076,121

(22) Filed: Mar. 21, 2016

(65) Prior Publication Data

US 2016/0294172 A1 Oct. 6, 2016

Related U.S. Application Data

(60) Provisional application No. 62/140,831, filed on Mar. 31, 2015.

(51) Int. Cl.
*H02G 3/08* (2006.01)
(52) U.S. Cl.
CPC ............ *H02G 3/086* (2013.01); *H02G 3/081* (2013.01)
(58) Field of Classification Search
USPC ........................................................ 174/50
See application file for complete search history.

(56) References Cited

U.S. PATENT DOCUMENTS

| | | | |
|---|---|---|---|
| 3,341,268 A | 9/1967 | Bickford | |
| 3,622,029 A | 11/1971 | Ware | |
| 3,690,501 A | 9/1972 | Ware | |
| 4,558,172 A | 12/1985 | Zetena | |
| 4,613,728 A | 9/1986 | Lathrop | |
| 4,642,418 A | 2/1987 | Menchetti | |
| 4,758,687 A | 7/1988 | Lathrop | |
| 4,778,399 A | 10/1988 | Schenk | |
| 4,950,840 A | 8/1990 | Zetena | |
| 5,257,946 A | 11/1993 | MacMillan et al. | |
| 5,574,256 A | 11/1996 | Cottone | |
| 6,162,071 A * | 12/2000 | Muller | A47B 21/06 174/502 |
| 7,141,736 B2 | 11/2006 | Plankell | |
| RE41,661 E | 9/2010 | Dinh | |
| 7,825,336 B2 * | 11/2010 | Peck | H01R 13/514 174/50 |
| 8,389,855 B2 | 3/2013 | Plankell | |
| 8,569,619 B2 | 10/2013 | Gretz | |
| 2013/0306343 A1 | 11/2013 | Magno, Jr. et al. | |

* cited by examiner

*Primary Examiner* — Dhirubhai R Patel
(74) *Attorney, Agent, or Firm* — Hoffmann & Baron, LLP

(57) ABSTRACT

A while-in-use electrical box including a housing having a front wall, a back wall, a top wall, a bottom wall and two opposed side walls. The housing has a longitudinal axis extending along the length of the box between the two side walls. The housing has a transverse axis extending from the back wall to the front wall. A device plate is disposed within the housing dividing the housing into a first section and a second section. The first section of the housing is enclosed and adapted to house an electrical device and the second section forms an electrical device access area. The device plate has a first panel forming a face plate for receiving a face of the electrical device. The second section is spaced from the first section along the longitudinal axis, and the face plate is in a non-parallel, non- perpendicular alignment with the housing transverse axis.

18 Claims, 5 Drawing Sheets

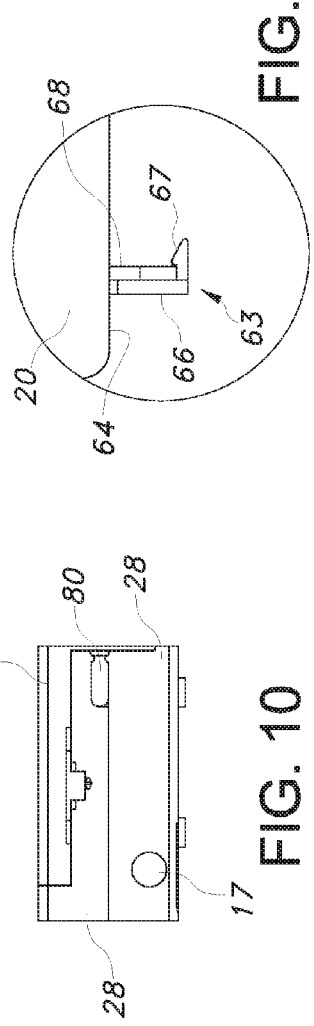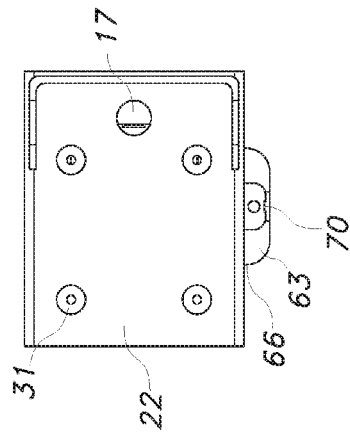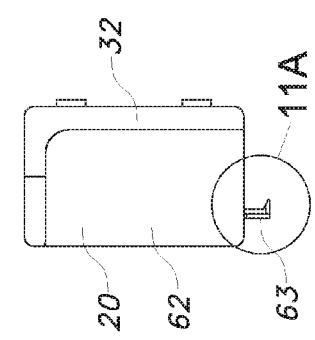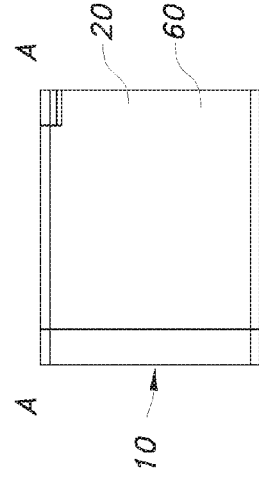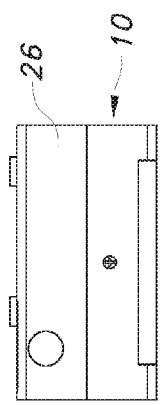

LOW PROFILE WHILE-IN-USE ELECTRICAL BOX AND COVER

This application claims the benefit of priority to U.S. Provisional Patent Application Ser. No. 62/140,831 filed on Mar. 31, 2015, the contents of which are incorporated by reference herein in their entirety for all purposes.

FIELD OF THE INVENTION

The present disclosure relates to a while-in-use electrical box and cover therefor. In particular, the disclosure is directed to a low-profile electrical box for housing an electrical device and having a lid, which in the open position provides for ease of access to the electrical device.

BACKGROUND

Wall mountable outdoor electrical boxes and covers are typically sold as two separate products. The electrical box houses an electrical device such as an outlet or switch. The cover typically is attached to the box and includes a lid that selectively covers and uncovers a cover interior to provide access to the electrical device. Once the electrical box with the electrical device is fixed to the wall, a standard while-in-use cover is mounted over the box. Therefore, the outlet box and the cover extend along the depth of these two components. This causes the combined box and cover to protrude a significant distance from the wall. The combined products can easily be bumped into by someone walking by, such as someone mowing their lawn or a maintenance person. Damage to the cover and box may result leading to the elements entering the cover and contaminating and degrading the electrical device.

Accordingly, it would be desirable to provide an electrical box and cover combination which reduces the amount that the box and cover protrude from a wall surface.

SUMMARY

The present disclosure provides a while-in-use electrical box including a housing having a front wall, a back wall, a top wall, a bottom wall and two opposed side walls. The housing has a longitudinal axis extending along the length of the box between the two side walls. The housing has a transverse axis extending from the back wall to the front wall. A device plate is disposed within the housing dividing the housing into a first section and a second section. The first section of the housing is enclosed and adapted to house an electrical device and the second section forms an electrical device access area. The device plate has a first panel forming a face plate for receiving a face of the electrical device. The second section is spaced from the first section along the longitudinal axis, and the face plate is in a non-parallel, non-perpendicular alignment with the housing transverse axis.

The present disclosure also provides a low profile while-in-use box and cover includes a housing having a longitudinal axis extending between the two sides. A lid, movable between an open and a closed position, is pivotable about an axis of rotation extending along a top, front edge of the electrical box. The axis of rotation is generally parallel to the longitudinal axis. A device plate is disposed within the housing and divides the housing into a first section and a second section. The first section is offset from the second section along the housing longitudinal axis. The first section is adapted to house an electrical device having a face. The device plate retains the face of the electrical device in a non-parallel, non-perpendicular alignment with the lid axis of rotation.

The present disclosure still further provides a while-in-use electrical box includes a housing having a first section and a second section. The housing has a front wall, a back wall, a top wall, a bottom wall and two opposed side walls. The housing has a longitudinal axis extending along the length of the box between the two side walls, and has a transverse axis extending from the back wall to the front wall. The first section is adapted to house an electrical device. A device plate for receiving a face of the electrical device and for securing the electrical device thereto is disposed in the housing. A lid is pivotally secured to the housing and has an open position to provide access to the second section. The second section provides a user access area for an operator which is accessible when the lid is in the open position from both the front of the box and the side of the box. The second section is spaced from the first section along the longitudinal axis. The device plate is in a non-parallel, non-perpendicular alignment with the housing transverse axis.

BRIEF DESCRIPTION OF THE DRAWINGS

FIG. 8 is a front elevational view of the electrical box of FIG. 1 showing the lid in the closed position.

FIG. 9 is a top plan elevational view of the electrical box of FIG. 1 showing the lid in the closed position.

FIG. 10 is a bottom elevational view of the electrical box of FIG. 1 showing the lid in the closed position.

FIG. 11 is a side elevational view of the electrical box of FIG. 1 showing the lid in the closed position.

FIG. 11A is a detailed view of a latch.

FIG. 12 is a rear elevational view of the electrical box showing the lid in the closed position.

DETAILED DESCRIPTION

Figure 2:
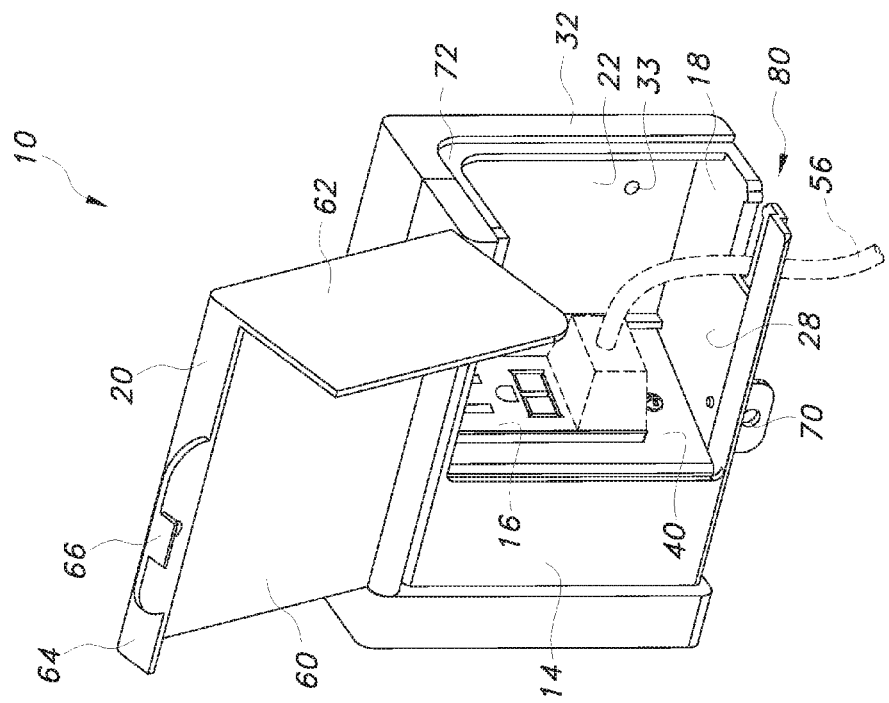
FIG. 2 is a perspective view of the electrical box of FIG. 1 showing the lid in the open position.
Figure 1:
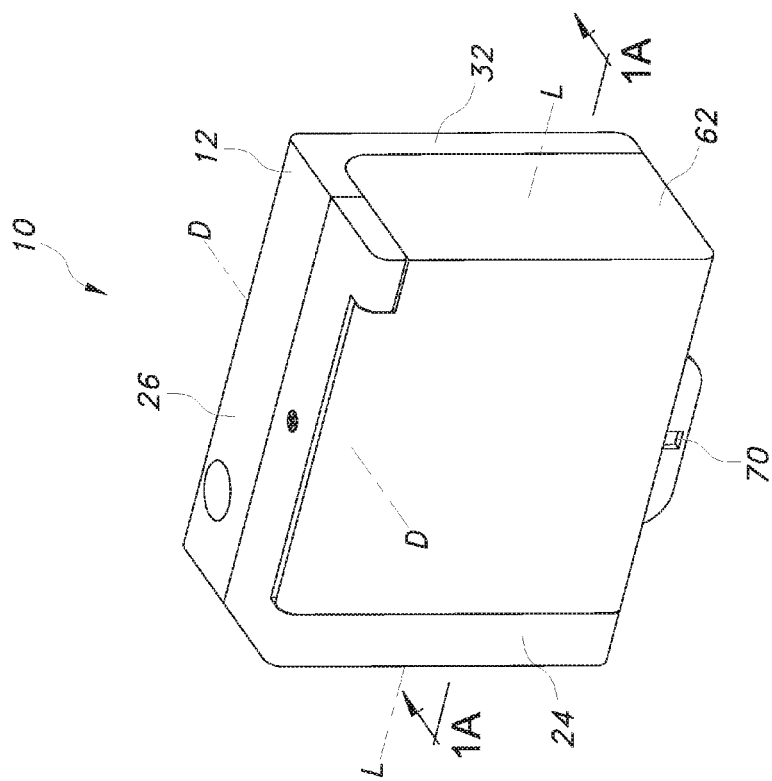
FIG. 1 is a perspective view of the electrical box of the present disclosure showing a lid in the closed position.
Figure 3:
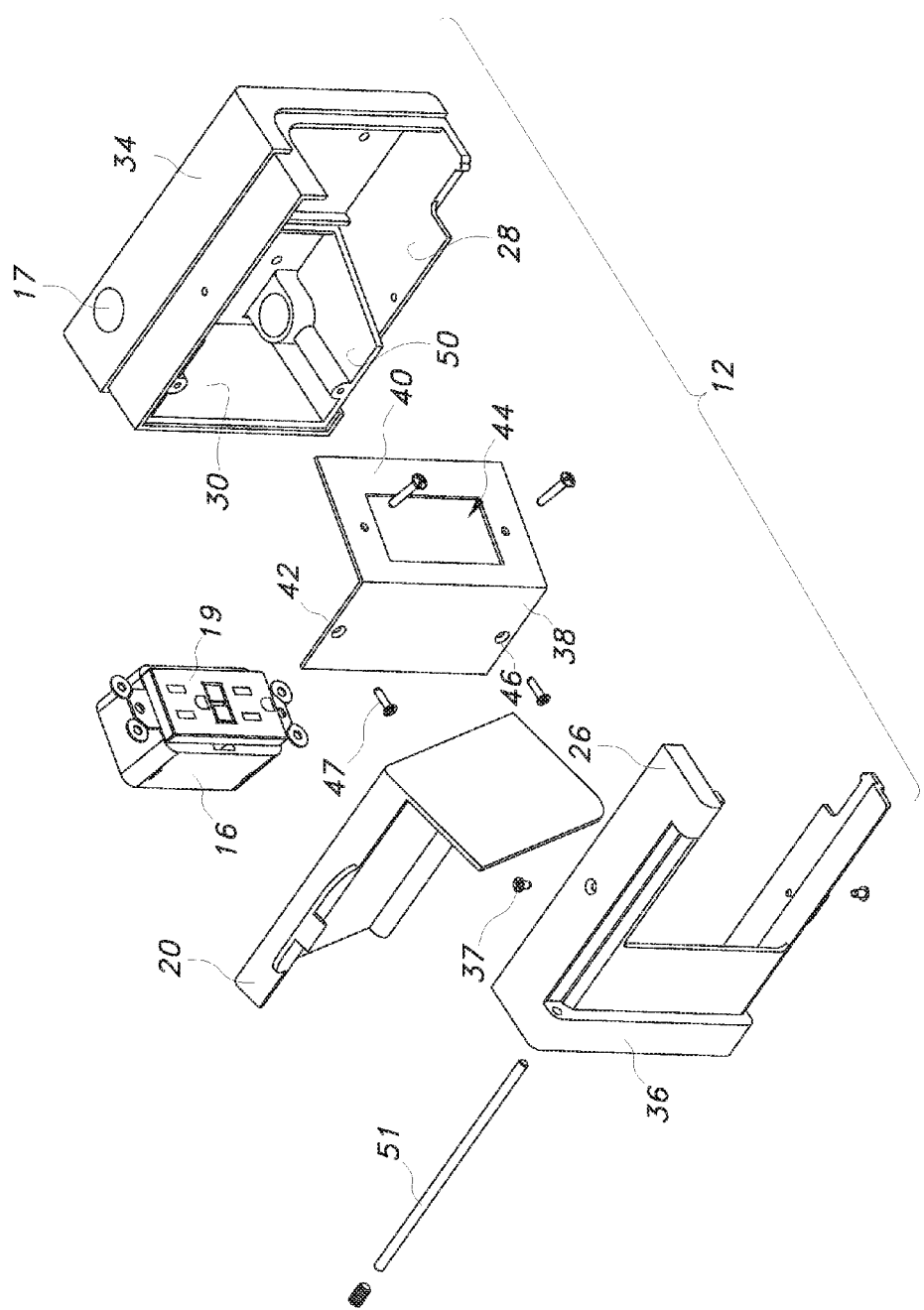
FIG. 3 is an exploded view of the electrical box of FIG. 1.
Figure 7:
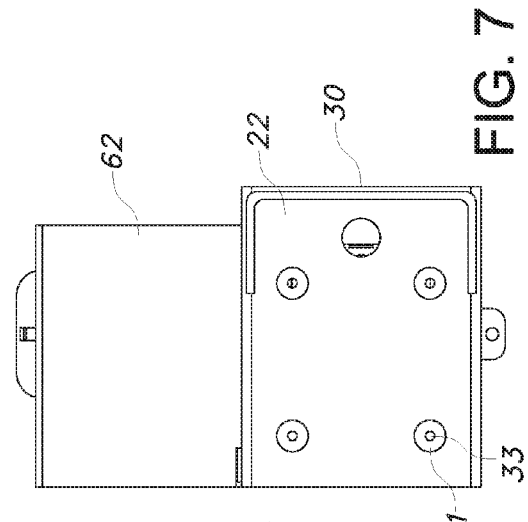
FIG. 7 is a back elevational view of the electrical box of FIG. 1 showing the lid in the open position.

With reference to FIGS. 1-3, a combination electrical box and cover 10 (hereinafter referred to as "electrical box" or "box") for outdoor use in shown. The electrical box 10 performs the function of an electrical box and while-in-use cover in one integrated unit.

The electrical box 10 includes a housing 12 having a first section 14 in which an electrical device 16, such as an outlet or switch is enclosed and secured. The first section 14 is fully enclosed with the only opening being that which accommodates a face 19 of the electrical device 16. Wiring may be brought into this enclosed first section of the box 10 through knockout openings 17 and safely shielded from contact by a user. The housing 12 has a second section 18 which permits user access to the electrical device 16. The second section 18 is selectively covered and uncovered by a lid 20. Access to the electrical device face 19 is available when the lid 20 is in the open position, for example, in order to plug and unplug a cord 56 into the electrical device 16. The first section 14 remains enclosed when the lid 20 is open.

In the preferred embodiment, the electrical box 10 has a generally rectangular configuration including a back wall 22, front wall 24, top 26 and bottom 28 walls, and two opposed sidewalls 30 and 32. The back wall 22 extends the length of the first 14 and second 18 sections. The back wall 22 provides a mounting surface for securing the box to a support structure. A portion of the front wall 24 and sidewall 32 is formed by the lid 20. The electrical box 10 may be formed of a polymer material of the type typically used to form outdoor outlet boxes and covers. However, it is contemplated that other materials, including metal, could be used to form all or portions of the electrical box 10.

The second section 18 of the box allows user access to the electrical device 16. This section 18 is disposed to the side of the first section 14 housing the electrical device 16. Therefore, the first 14 and second 18 sections are offset from each other a distance extending along the longitudinal axis of the box L-L. The longitudinal axis L-L extends in a direction between the two sides 30 and 32. Since the first 14 and second 18 sections are arranged side-by-side, the depth of the box, D shown in FIG. 1, i.e., the distance between the back wall 22 and the front wall 24 of the box can be minimized.

Figures 1A, 1B:
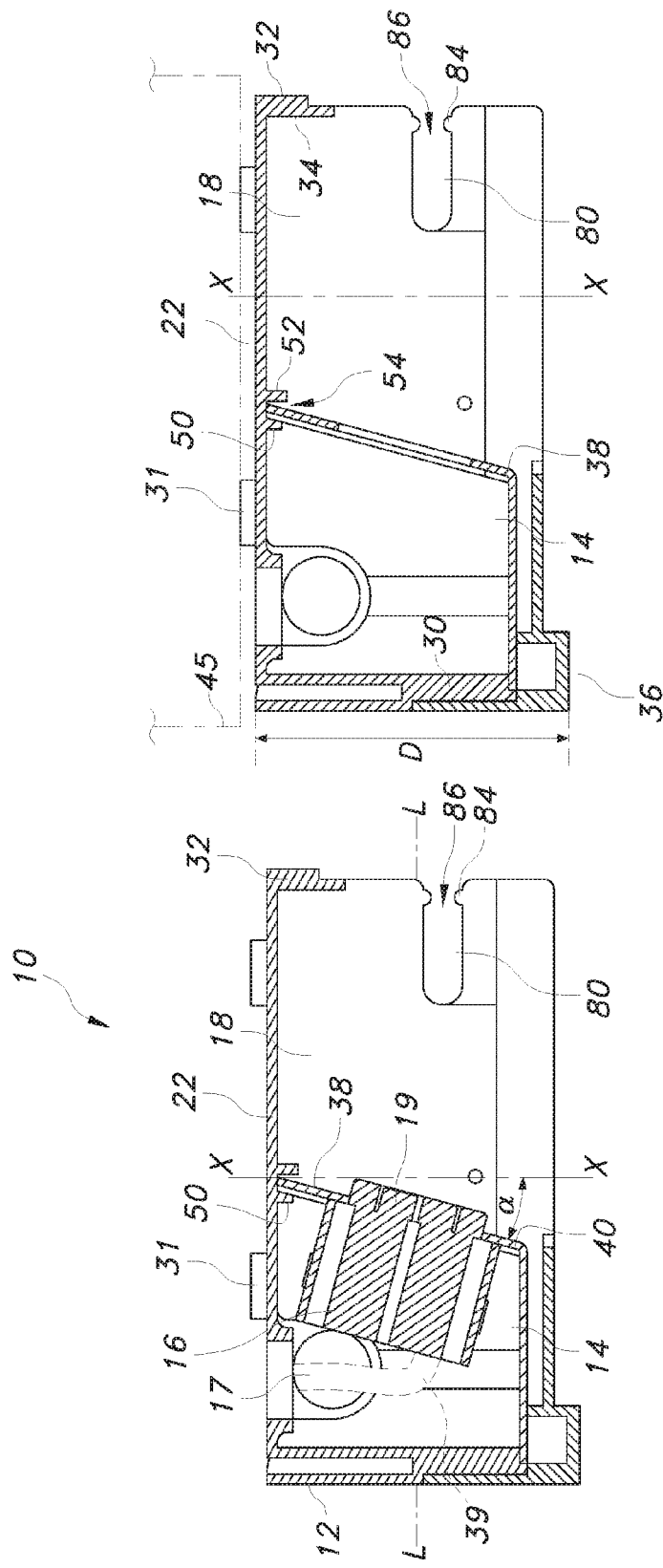
FIG. 1A is a cross-sectional view of the electrical box taken along line 1A-1A of FIG. 1 with an electrical device in the box.
FIG. 1B is a cross-sectional view of the electrical box taken along line 1A-1A of FIG. 1 without an electrical device in the box.

With reference to FIGS. 1A, 1B, and 12, the back wall 22 of the electrical box further includes a plurality of mounting projections to mount the box to a wall surface 45. The projections 31 may include holes 33 therein to permit a fastener (not shown) to pass there through.

With reference to FIGS. 1A, 2, and 3, the housing 12 may include a box back portion 34 and a box front portion 36 secured to the box back 34. A device plate 38 may be secured to the box back portion 34 to form therewith a compartment that isolates the housing first section 14, and the electrical device wiring 39 therein, from the open second section 18. The device plate 38 may have first and second joined panels 40 and 42 to form a generally L-shaped element. The two panels 40 and 42 may form an obtuse angle as shown in FIG. 1B. The first panel 40 forms a face plate and may have an opening 44 formed therein corresponding to the configuration of the face of an electrical device. For example, as shown in FIG. 3 the opening 44 is generally rectangular in order to accommodate the face of a standard GFCI duplex receptacle. It is within the contemplation of the present invention that the opening 44 could have different configurations to match other electrical devices. Multiple device plates could be provided with the box in order to accommodate different electrical devices. The second panel 42 may have a generally continuous uninterrupted surface with through holes 46 therein to accommodate fasteners 47 to secure the device plate 38 to the box back 34.

With reference to FIGS. 1A and 2, the electrical device 16 is retained in the box 10 in an alignment wherein the electrical device front face 19 generally faces the side 32 of the box as well as the front of the box. The alignment of the electrical device is set by the device plate 38 and in particular the face plate 40 to which the electrical device 16 is attached. As shown in FIGS. 1A and 1B, the face plate 40 is angled to the side and, to a certain degree, toward the front of the electrical box 10. The face plate 40 is positioned such that it is neither perpendicular nor parallel to the longitudinal axis L-L of the electrical box. The electrical box 10 may have a transverse axis X-X extending from the front of the box to the back, defining the box depth, D, and perpendicular to the longitudinal axis L-L. The face plate 40 is positioned such that it, and the electrical device 16 attached thereto, also is neither perpendicular nor parallel to the transverse axis X-X of the electrical box. The face plate 40 has a front surface that defines a plane that forms an angle $\alpha$ with respect to the transverse axis X-X as shown in FIG. 1A. This angle may be in the range between 1 to 89 degrees, and more preferably 5 and 25 degrees. In a preferred embodiment, the angle $\alpha$ may be 15 degrees. These angles are meant to be illustrative and not limiting. By having the face plate 40 in this position, the electrical device 16 attached to the face plate will project generally along the longitudinal axis L-L and to a lesser degree along the transverse axis X-X. In this way, the depth D of the box and cover combination can be minimized. However, since the electrical device 16 is also be angled toward the front of the box as shown in FIGS. 1A and 6, this assists in providing user access to the electrical device 16.

The electrical box 10 is typically mounted with its back wall 22 against a support structure 45, such as a wall, as shown in FIG. 1B. The amount the electrical box 10 projects outwardly from such a structure depends upon the depth, i.e., the dimension along the transverse axis X-X. Since the depth of the electrical box can be kept to a minimum, the electrical box creates less of a protrusion into the space and makes it less likely to be bumped or knocked into or otherwise damaged. Essentially, the box 10 lies flatter against the mounting surface than in traditional weatherproof electrical boxes and covers. Based on the location of the electrical device containing first section 14 and the user accessible second section 18 being offset from each other along the length of the box, the depth of the box can be kept to a minimum and preferably no more than 3¾ inches. This dimension is intended to be illustrative and not limiting.

With reference to FIGS. 1A, 1B and 3, the box back 34 may include a raised abutment 50 extending upwardly from the bottom wall 28 and outwardly from the back wall 22. The abutment 50 adjoins and supports the back edge of the device face plate 40. This abutment extending from the bottom wall is at the angle $\alpha$ with respect to transverse axis X-X to match the face plate 40. In addition, a rib 52 may extend outwardly from the back wall adjacent to the abutment. The rib 52 and abutment 50 form a slot extending along the back wall to receive an edge of the face plate 40. The rib 52 and abutment 50 support the device plate 38 and allow it to resist pushing and pulling forces such as those associated with plugging and unplugging the power cord 56.

Figure 4:
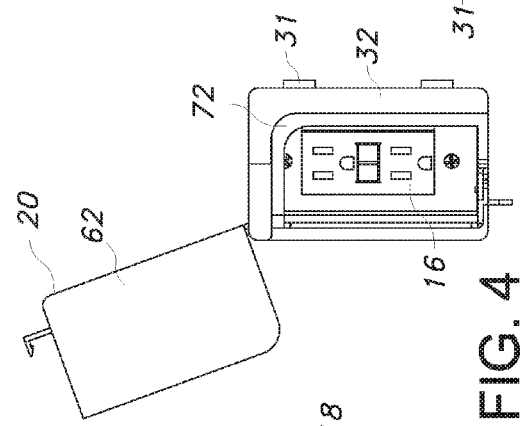
FIG. 4 is a side elevational view of the electrical box of FIG. 1 showing the lid in the open position.
Figure 5:
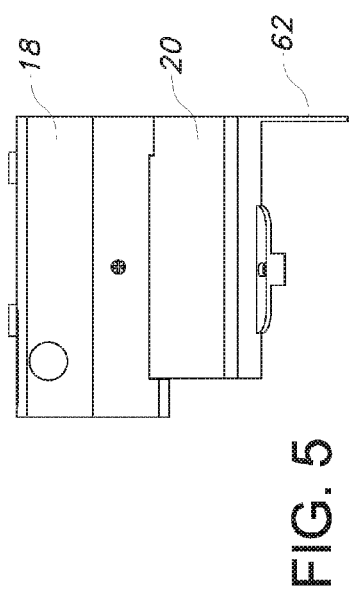
FIG. 5 is a top plan view of the electrical box of FIG. 1 showing the lid in the open position.
Figure 6:
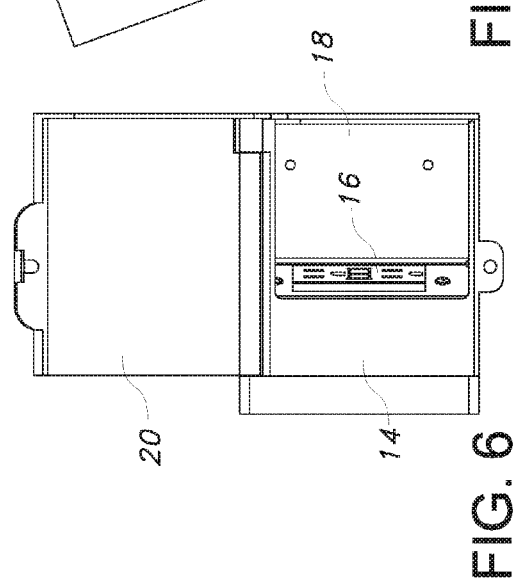
FIG. 6 is a front elevational view of the electrical box of FIG. 1 showing the lid in the open position.

With reference to FIGS. 3 and 4-7, the second section of the box housing 18 is selectively covered by the lid 20. The lid 20 is pivotally attached to the box front 36 and has an axis of rotation extending along the length of the box. The lid 20 may be rotated to the open position in which is its substantially in a vertical position such that it is out of the way of the opening to the box second section 18. The lid is hinged via a hinge pin 51 adjacent the top wall 26 of the electrical box such that when the lid 20 is in the open position as shown in FIGS. 4 and 6, significant access into the box second section 18 is provided. The lid may have axis of rotation A-A, FIG. 8 which extend in the direction of the longitudinal axis of the box L-L. Accordingly, the face plate 40 is positioned such that it is neither perpendicular nor parallel to the lid axis of rotation A-A.

The lid 20 may extend all the way to one side of the box. The lid 20 also has a side portion 62 extending orthogonally from the front portion 60. The side portion may have a generally rectangular configuration. The lid side portion forms a portion of the box sidewall 32 when the lid 20 is in the closed position as showing in FIGS. 2, and 8-12. The sidewall 30 opposed from sidewall 32 may be a solid member which remains fixed to the electrical box even when the lid 20 is moved between an open and closed position. The lid 20 includes a first front planar portion 60 which forms a portion of the front wall of the box.

With reference to FIGS. 2 and 4, sidewall 32 of the electrical box housing may include an L-shaped recessed portion 72 which corresponds to a top and side edge of the lid side portion 62. Accordingly, when the lid 20 is in the closed position, as shown in FIG. 1, the lid 20 and remaining portion of the sidewall 32 of the box are substantially flush as shown in FIGS. 1, 9 and 11.

With reference to FIGS. 10-11A and 12, the electrical box 10 may include a closure device 63 in order to retain the lid 20 in the closed position. The closure device 63 includes a first latch component 66 extending from a bottom edge 64 of the lid. The first latch component 66 may form a lifting tab in order to allow the user to grab the tab and lift the lid 20 to the open position. The first latch component 66 includes a ramped catch 67 extending therefrom. The closure device 63 also includes a second latch component 68 extending from the housing bottom wall 28. The second latch component 68 engages the catch 67, thereby retaining the lid 20 in the closed position. In order to open the lid 20, the catch 67 may be deflected away from and clear of the second latch component 68 such that the lid 20 can be pivoted toward the open position as shown in FIG. 2.

The first and second latch components 66 and 68 may each include a through hole 70 that aligns with each other in order to allow a securement device (not shown), such as a lock, to extend there through. In this way the lid 20 can be more securely retained in the closed positon.

With reference to FIGS. 1B and 2, the open second housing section 18 may include a slot 80 formed in the bottom wall 28 therein in order to accommodate the power cord 56. Accordingly, the lid 20 may be moved to the fully closed position without interference by the cord 56. Inwardly projecting opposed protrusions 84 disposed near the slot entrance 86 may narrow the slot and help to retain the chord in the slot. It is within the contemplation of the present invention that such a slotted cord-receiving element may be formed in other portions of the box including the lid or sidewall of the electrical box. The location of the cord receiving slot 80 on the bottom wall 28 is desirable, since if moisture should enter the box 10, it can drain out of the box through the open slot 80. It is within the contemplation of the present invention that a seal or elastomeric material may be inserted or formed around the edges of the slot in order to form a more watertight seal between the cord 56 and the box bottom wall 28.

With reference to FIGS. 1A, 2 and 3, in order to install the electrical device 16 in the electrical box 10, electrical wiring 39 may be brought into the box through threaded conduit openings 17 located in the top, back, and bottom walls of the first 14 section housing the electrical device 16. The wiring 39 may then be attached to the electrical device 16 in a manner known in the art. The electrical device 16 may then be attached to the device plate first panel 40. The device plate 38 may then be secured to the box back 34. The box front 36 may then be attached to the box back 34 by a fastener. The electrical device 16 and its associated wiring are thereby safely enclosed. A user may pivot the lid 20 to the open position to access the electrical device 16. When the lid 20 is in the open position, part of the front and side of the box 10 are exposed. This creates ease of access to the second section 18. In addition, since the electrical device 16 is oriented such that is faces both the side and front of the box, a user can easily access the electrical device 16 to for example, to plug and unplug a power cord. If the electrical device 16 is in the form of an outlet, the user may plug in a cord 56 and guide the cord through the slot 80. The user may then pivot the lid 20 to the closed position such that the closure device 63 secures the lid in the closed position.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A while-in-use electrical box comprising:
   a housing having a front wall, a back wall, a top wall, a bottom wall and two opposed side walls, the housing having a longitudinal axis extending along the length of the housing between the two side walls, the housing having a transverse axis extending from the back wall to the front wall;
   a device plate disposed within the housing dividing the housing into a first section and a second section, the first section of the housing is enclosed and adapted to house an electrical device and the second section forms an electrical device access area, the device plate having a first panel having an opening adapted to receive a face of the electrical device, and the device plate has a second panel joined to the first panel at a non-right angle, wherein the second section is spaced from the first section along the longitudinal axis, and the first panel is in a non-parallel, non-perpendicular alignment with the transverse axis of the housing.

2. The electrical box as defined in claim 1, wherein the first panel forms a plane that is offset from the transverse axis at an angle between 5 and 25 degrees.

3. The electrical box as defined in claim 2, wherein the plane of the first panel is offset from the transverse axis at an angle of 15 degrees.

4. The electrical box as defined in claim 1, wherein a lid is pivotally secured to the housing and moveable between an open and a closed position to selectively provide and restrict access to the second section.

5. The electrical box as defined in claim 4, wherein the lid forms a portion of the front wall and a portion of one of the side walls of the housing.

6. The electrical box as defined in claim 1, wherein the housing includes a back portion and a front portion removably secured to the back portion.

7. A low profile while-in-use box and cover comprising:
   a housing having, a front, two opposed sides and having a longitudinal axis extending between the two sides;
   a lid movable between an open and a closed position and which is pivotable via a hinge about an axis of rotation, and wherein the axis of rotation is generally parallel to the longitudinal axis of the housing;

a device plate disposed within the housing and dividing the housing into a first section and a second section, the first section being offset from the second section along the longitudinal axis of the housing, the first section having an interior capable of receiving an electrical device having a face, and wherein the device plate retains the face of the electrical device in a non-parallel, non-perpendicular alignment with the lid axis of rotation; and the device plate including a first panel forming an opening adapted to receive the face of the electrical device and a second panel extending at a non-right angle from the first panel.

8. The low profile while-in-use box and cover of claim 7, wherein the second section is an open access area which is accessible by a user when the lid is in the open position from both the front of the housing and the side of the housing.

9. The low profile while-in-use box and cover of claim 7, wherein the device plate retains the electrical device such that the face of the electrical device faces both the housing front and one of the housing sides.

10. The low profile while-in-use box and cover of claim 7, wherein a bottom front edge of the housing includes a securement element, and the securement element includes an aperture, and the lid includes a lift tab having an aperture and the aperture of the lift tab axially aligns with the aperture of the securement element when the lid is in the closed position.

11. The low profile while-in-use box and cover of claim 7, wherein the first section includes a conduit opening in a top, a back and a bottom of the housing.

12. The low profile while-in-use box and cover of claim 7, wherein a back wall of the housing includes at least one mounting projection adapted to mount the housing to a support structure.

13. The low profile while-in-use box and cover of claim 7, wherein, the second panel covers a portion of the first section.

14. A while-in-use electrical box comprising:

a housing having a front wall, a back wall, a top wall, a bottom wall and two opposed side walls, the housing having a longitudinal axis extending along a length of the housing between the two side walls, and having a transverse axis extending from the back wall to the front wall;

a device plate disposed within the housing and dividing the housing into a first section and a second section, the first section having an interior adapted to house an electrical device, the device plate having a first panel having an opening adapted to receive a face of the electrical device, and the device plate having a second panel joined to the first panel at a non-right angle; and a lid pivotally secured to the housing and having an open and a closed position to provide access to the second section, the second section providing a user access area for a user which is accessible when the lid is in the open position from both the front of the housing and the side of the housing, the second section is spaced from the first section along the longitudinal axis of the housing, and the device plate is in a non-parallel, non-perpendicular alignment with the transverse axis of the housing.

15. The low profile while-in-use box and cover of claim 14, wherein the device plate forms a plane that is offset from the transverse axis at an angle between 5 and 25 degrees.

16. The low profile while-in-use box and cover of claim 14, wherein the housing has a back portion and a front portion which are removable secured together to form the housing, and the lid is pivotally connected to the front portion.

17. The low profile while-in-use box and cover of claim 14, wherein the lid has a front portion and a side portion extending generally orthogonally from the front portion, and the front portion closing a portion of the front wall and the side portion closing a portion of one of the side walls of the housing when the lid is in the closed position.

18. The low profile while-in-use box and cover of claim 14, wherein the second section includes a cutout adapted to receive a cord.

\* \* \* \* \*